United States Patent Office 2,745,966
Patented May 15, 1956

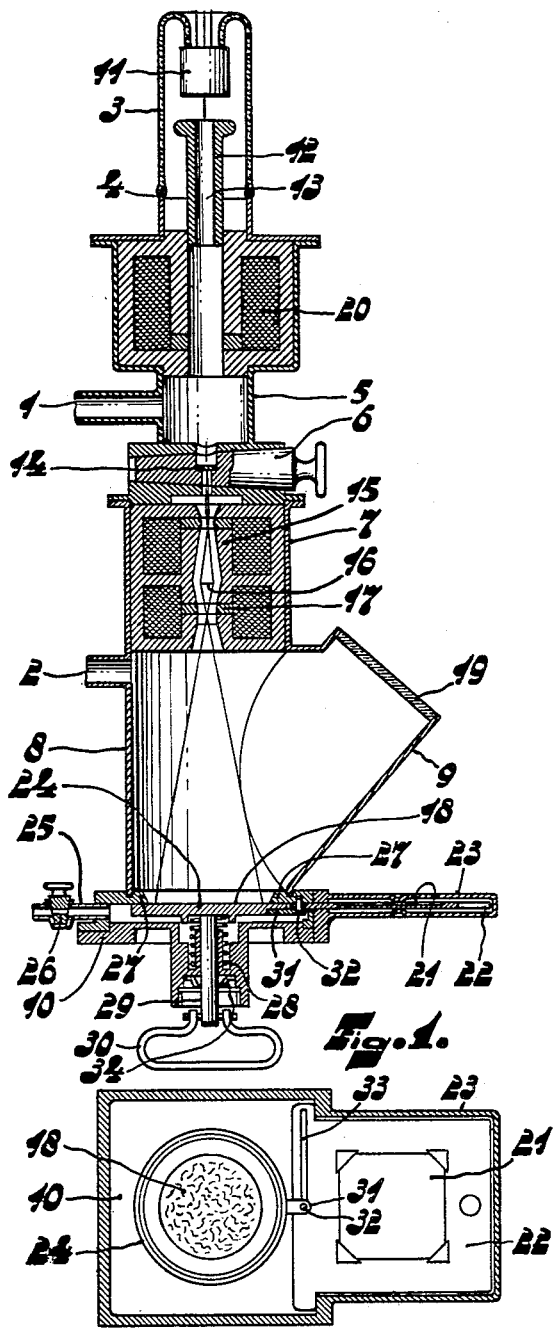

2,745,966

ELECTRON-DIFFRACTION APPARATUS

Adrianus Verhoeff, Eindhoven, Netherlands, assignor to Hartford National Bank and Trust Company, Hartford, Conn., as trustee Application November 19, 1952, Serial No. 321,295

Claims priority, application Netherlands December 20, 1951

3 Claims. (Cl. 250—49.5)

Electron-diffraction apparatus permit of taking diffraction images of crystalline materials. The testing of such materials is based on diffraction of the rays in crystal gratings due to an interference phenomenon. Diffractions occur at different angles which are typical for the structure of crystals. In the case of a multitude of crystals, electron deflection occurs multilaterally and evenly with the production of luminous circles on a luminescent screen capturing the diffracted rays. From the brightness and spacing of the circles inferences can be drawn about the nature of the material to be tested. In the case of scantiness of crystals, the circles may be of uneven brightness and may even split up into a number of patches or points on the circumference of a circle.

As a rule, the diffraction image is first made visible on the luminescent screen and subsequently on the photographic plate. From the image on the screen the definition and size of the diffractions are judged and ascertained whether the object is correctly adjusted, the photographic exposure being made after removing the screen.

The present invention concerns electron-diffraction apparatus permitting a structure image to be produced on a luminescent screen and on a photographic plate successively, and it has for its object to reduce the number of operations and to bring the image on the luminescent screen and the photographic exposure in fair agreement. In accordance with the invention the apparatus is designed in a manner such that after removal of the luminescent screen from the image plane, a holder for the photographic plate is moved into the beam by means of the support for the luminescent material and held by the support, the radiation-sensitive layer of the photographic plate occupying the same position as the luminescent screen in producing a directly visible image.

In order that the relative spacing of the circles in the diffraction image may be measured accurately, a high degree of definition is required. For this reason the diffraction image is preferably magnified electron optically. Optimum definition with the use of an electron lens is obtained if the image layer is provided in the plane where the beams passing through the lens have the smallest diameter. When using exactly parallel beams this image plane is at the focus of the lens. Said diffraction image can be magnified by means of another electron-optical lens. The luminescent screen permits the adjustment of the lenses to be controlled and a high degree of definition to be obtained. The invention provides that this adjustment is associated with optimum definition of the image on the photographic plate.

After exposure of the photographic plate it can be removed from the beam by means of the support for the luminescent material, the luminescent screen then resuming its initial position. In a suitable embodiment of the invention, the support then engages a rim which surrounds the image plane and is integral with the electron-discharge tube containing the object and the electron-optical enlarger, said support separating in an air-tight manner the space within the electron discharge tube from the chamber accommodating the photographic plate. By admitting air into this chamber the plate holder can be removed and the photographic plate replaced by a fresh plate. After replacing the holder into the chamber the air is pumped out and the next exposure can be made.

The support for the luminescent material may be a flat circular plate whose centre coincides with the axis of the electron-discharge tube and is furnished with a central upright pin which passes rearwards through an aperture provided in the bottom of the apparatus and wherein it is rotatable about its axis and displaceable in its axial direction, the pin moreover closing said aperture in an air-tight manner. A handle secured to the end of the pin protruding from the bottom permits the support to be shifted and subsequently turned through 180° about its axis, a coupling between the support and the holder for the photographic plate permitting the latter to be displaced in the desired direction.

In order that the invention may be readily carried into effect it will now be described in greater detail with reference to the accompanying drawing, given by way of example, which represents one form of an electron-diffraction apparatus according to the invention, which comprises an electron-optical enlarger.

In the drawing,

Fig. 1 is a section through the optical axis of the cathode-ray tube, and

Fig. 2 is a detail view of the actuating mechanism for the holder of the photographic plate.

The electron-discharge tube consists of a closed vessel comprising several parts, which, during operation, is consistently connected to an air-pump through suction piping 1 and 2 and in which a vacuum is maintained. At the top, a glass tube 3 is sealed with its edge to a metal casing 4. Fastened to the latter is a metal intermediate piece 5 at the lower end of which is provided a plug valve 6. Then follows a wider metal cylinder 7 and finally a portion 8 furnished at one side with an inclined branch pipe 9 and closed by a bottom 10 at its lower end.

The glass tube 3 contains a source of electrons 11 and a cylinder 12 fastened to the metal casing 4. A source of potential (not shown) maintains a high direct voltage of, say, 100 kv. between the source of electrons 11 and the cylinder 12. The cylinder 12 is positive so that it acts as an anode and a beam of electrons passes from the gun made up of the parts 11 and 12 along the axis 13 into the vessel.

The plug valve 6 contains a holder 14 for the object which may, for example, be a minute crystal or a small piece of microscopic tissue. The beam of electrons passes through the object and is subsequently influenced by an electron-optical lens 15, viz. the object glass. This lens projects a structure image 16 of the object within the holder 14, which image is approximately located in the focal plane of the lens. A second lens 17 projects a magnified image on a luminescent screen 18. A branch pipe 9 permits the image to be viewed and is hermetically closed by a glass plate 19, if desired a magnifying glass.

Between the electron gun and the object holder, the metal casing 4 contains an electron-optical lens 20. Thin lens serves to cause a larger part of the radiation from the gun to reach the object, thus increasing the definition.

In order for the luminescent screen to be sharply adjusted the current through the coils of the magnetic lenses is varied until the desired image on the screen has maximum definition.

If the image is subsequently to be photographed the photographic plate 21 is introduced into the beam of rays. The photographic plate 21 is clamped to a holder 22 and contained in a chamber 23 communicating with a space between the bottom 10 and the support 24 for the luminescent screen. This space is connected with a vacuum pump through a pipe 25 comprising a valve 26. The support 24 engages the edge 27 of portion 8 intimately to close the discharge vessel in an air-tight manner. With the valve 26 open, the chamber 23 is exhausted, thus removing the pressure urging the support 24 against the edge 27 of portion 8 of the wall of the electron-discharge tube. The gentle pressure of spring 28 is easily surmounted thus permitting the support to be moved towards the bottom 10 by means of a handle 30 fitted to central upright pin 29. The handle 30 is subsequently turned one half turn, a catch 31 secured to the support and provided with an upright pin 32 extending into the slot 33 of the holder 22 for the photographic plate, displacing the holder 22 and consequently the photographic plate 21 in the beam of radiation. On releasing the handle 30, the spring 28 urges the support 24 against the holder 22 to make the latter engage the edge 27.

After making the exposure the handle 30 is turned back and the plate holder 22 is reintroduced into the chamber 23, the support 24 resuming its initial position and closing the electron-discharge tube in an air-tight manner. The valve 26 is now closed and air may be admitted into the chamber. The photographic plate may be removed and replaced by a fresh one.

A rubber ring 34 serves for an air-tight closure of the pin 29 in the aperture of the bottom 10.

During the displacement of the photographic plate it may be desirable for the beam to be switched off or to be intercepted, but as a rule the intensity of radiation is low so that no appreciable exposure of the photographic layer takes place during the time required for said displacement. The apparatus may be such that by the operations for switching off the beam (for example by removing the accelerating voltage or by intercepting or deflecting the beam) and for switching it on again are effected automatically upon axial displacement of the support for the luminescent screen.

What I claim is:

1. In an electron diffraction apparatus for producing an image of an object disposed in the path of an electron beam on a luminescent screen and on a photographic plate, respectively, including an evacuated chamber, means within said chamber to generate an electron beam, means to support the object in the path of the beam, means to project an electron image of the object onto the luminescent screen and photographic plate, respectively, and means to alternately position said luminescent screen and said photographic plate in the path of said electron beam to reproduce the projected image of said object, said last means including a support for said luminescent screen comprising a flat circular plate having a central axis coincident with the electron beam, a centrally-disposed pin member having a given axis, and connected to said plate and extending rearwardly from said plate through an aperture in a wall of the vessel, means outside said vessel to rotate said pin member about said given axis and to move said pin member along said given axis, a displaceable holder for said photographic plate disposed adjacent said support for said screen, means interconnecting said flat circular plate and said photographic plate holder and adapted upon rotation and displacement of said pin to move said holder transverse to said given axis of said pin into the position previously occupied by said round plate for the taking of a photograph.

2. In an electron diffraction apparatus for producing an image of an object disposed in the path of an electron beam on a luminescent screen and on a photographic plate, respectively, including an evacuated chamber, means within and at one end of said chamber to generate an electron beam, said evacuated chamber having a round rim defining a circular aperture at its other end in the path of the electron beam, means to support the object in the path of the beam, means to project an electron image of the object into the luminescent screen and photographic plate, respectively, and means to alternately position said luminescent screen and said photographic plate in the path of said electron beam to reproduce the projected image of said object, said last means including a support for said luminescent screen comprising a flat circular plate abutting the round rim and closing off the circular aperture in said evacuated chamber, said flat plate having a central axis coincident with the electron beam, means urging said flat plate into engagement with said rim, a centrally-disposed pin member having a given axis, and connected to said plate and extending rearwardly from said plate, a second chamber surrounding a portion of said pin and enclosing said flat plate, said pin extending through an aperture in a wall of said second chamber, means outside said second chamber to rotate said pin member about said given axis and to move said pin member against the action of said urging means along said given axis, a displaceable holder for said photographic plate disposed within said second chamber and adjacent to said support for said screen and also in engagement with a portion of said round rim of said evacuated chamber, means interconnecting said flat circular plate and said photographic plate holder and adapted upon rotation and displacement of said pin to move said holder transverse to said given axis of said pin into the position previously occupied by said circular plate in which it engages said rim for the taking of a photograph.

3. In an electron diffraction apparatus as claimed in claim 2 in which the interconnecting means between the flat plate and the photographic plate holder comprises a slot in the holder, and a pin secured to the periphery of said flat plate and slidably engaging said slot.

References Cited in the file of this patent

UNITED STATES PATENTS

| | | |
|---|---|---|
| 1,646,065 | Pohlmann | Oct. 18, 1927 |
| 2,200,095 | Marton | May 7, 1940 |
| 2,360,871 | Griswold | Oct. 24, 1944 |
| 2,372,422 | Hillier | Mar. 27, 1945 |